US010120652B2

(12) United States Patent
Chandra et al.

(10) Patent No.: US 10,120,652 B2
(45) Date of Patent: Nov. 6, 2018

(54) SYSTEM AND METHOD FOR REPRESENTING SOFTWARE DEVELOPMENT REQUIREMENTS INTO STANDARD DIAGRAMS

(71) Applicant: WIPRO LIMITED, Bangalore (IN)

(72) Inventors: Aman Chandra, Bangalore (IN); Varun Anant, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/475,256

(22) Filed: Mar. 31, 2017

(65) Prior Publication Data

US 2018/0232210 A1 Aug. 16, 2018

(30) Foreign Application Priority Data

Feb. 16, 2017 (IN) .............................. 201741005589

(51) Int. Cl.
*G06F 9/44* (2018.01)
*G06F 8/10* (2018.01)
*G06F 8/20* (2018.01)
*G06F 8/35* (2018.01)

(52) U.S. Cl.
CPC .................. *G06F 8/10* (2013.01); *G06F 8/20* (2013.01); *G06F 8/35* (2013.01)

(58) Field of Classification Search
CPC ...................................................... G06F 8/10
USPC ......................................... 717/101–109, 116
See application file for complete search history.

(56) References Cited

U.S. PATENT DOCUMENTS

| | | | | |
|---|---|---|---|---|
| 6,405,364 B1 * | 6/2002 | Bowman-Amuah | ..... | G06F 8/20 717/101 |
| 7,020,869 B2 * | 3/2006 | Abrari | ....................... | G06F 8/10 706/47 |
| 7,392,162 B1 * | 6/2008 | Srinivasan | ................ | G06F 8/10 345/473 |
| 7,509,628 B2 * | 3/2009 | Hilerio | ................... | G06Q 10/06 717/101 |
| 7,954,083 B2 * | 5/2011 | Berenbach | .............. | G06F 17/50 717/105 |

(Continued)

OTHER PUBLICATIONS

Atkinson et al, "A Prototype Implementation of an Orthographic Software Modeling Environment", ACM, pp. 1-10, 2013.*

(Continued)

*Primary Examiner* — Anil Khatri
(74) *Attorney, Agent, or Firm* — Finnegan, Henderson, Farabow, Garrett & Dunner LLP (57) ABSTRACT

This disclosure relates generally to software development, and more particularly to a system and method for representing software development requirements into standard diagrams. In one embodiment, a method is provided for deriving use case diagrams for software development. The method comprises extracting one or more core components from each of a plurality of software development requirements, determining at least one activity from the one or more core components, extracting at least one of a class and an attribute from the one or more core components, and deriving at least one use case diagram based on the at least one activity and the at least one of the class and the attribute. The one or more core components comprise at least one of a core message and a condition.

19 Claims, 4 Drawing Sheets

(56) References Cited

U.S. PATENT DOCUMENTS

| | | | | |
|---|---|---|---|---|
| 7,992,134 B2* | 8/2011 | Hinchey | ............ | G06F 8/10 717/126 |
| 8,051,404 B2* | 11/2011 | McGovern | ............ | G06F 8/10 717/105 |
| 8,209,657 B1* | 6/2012 | Sawyer | ............ | G06F 8/10 717/100 |
| 8,225,271 B2* | 7/2012 | Eldridge | ............ | G05B 15/02 717/100 |
| 8,271,934 B2* | 9/2012 | Carteri | ............ | G06F 8/24 717/104 |
| 8,438,532 B2* | 5/2013 | Fox | ............ | G06F 8/36 717/100 |
| 8,621,420 B2* | 12/2013 | Brown | ............ | G06F 8/10 717/104 |
| 8,826,225 B2* | 9/2014 | Perrin | ............ | G06F 8/10 717/100 |
| 9,009,649 B2* | 4/2015 | Grechanik | ............ | G06F 8/36 707/765 |
| 9,026,985 B2* | 5/2015 | Cornell | ............ | G06F 8/10 700/31 |
| 9,430,591 B2* | 8/2016 | Klinger | ............ | G06F 8/74 |

OTHER PUBLICATIONS

Burger, "Flexible Views for View-Based Model-Driven Development", ACM, pp. 25-30, 2013.*

Case, "Computer-Aided Software Engineering (CASE): Technology for Improving Software Development Productivity", ACM, pp. 35-43, 1985 (Year: 1985).*

Squire, "Data Extraction and Transformation for the Data Warehouse", ACM, pp. 446-447, 1995 (Year: 1995).*

Yue et al, "Facilitating the Transition from Use Case Models to Analysis Models: Approach and Experiments", ACM Transactions on Software Engineering and Methodology, vol. 22, No. 1, Article 5, pp. 1-38, 2013. (Year: 2013).*

Cottonier et al, "Stateful Aspects: The Case for Aspect-Oriented Modeling", ACM, pp. 7-14, 2007 (Year: 2007).*

Meftech et al, "Implementation and Evaluation of an Approach for Extracting Feature Models from Documented UML Use Case Diagrams", ACM, pp. 1602-1609, 2015 (Year: 2015).*

Khatri et al, "A Software Reuse Reference Model Approach in Developing an Automated Educational System for Patients Health Care Management", ACM, pp. 675-678, 2001 (Year: 2001).*

Herchi, H. et al., "From user requirements to UML class diagram," dated Nov. 4, 2012.

* cited by examiner

SYSTEM AND METHOD FOR REPRESENTING SOFTWARE DEVELOPMENT REQUIREMENTS INTO STANDARD DIAGRAMS

TECHNICAL FIELD

This disclosure relates generally to software development, and more particularly to system and method for representing software development requirements into standard diagrams.

BACKGROUND

Agile method of software development describes a set of principles for software development under which requirements and solutions evolve through the collaborative effort of self-organizing cross-functional teams. The Agile method has become a new norm in today's world, and approximately 90% of the software projects incorporate some Agile principles in their software development. However, in spite of many benefits, adopting Agile has certain limitations.

For example, Agile projects need a very active involvement from the customers at all stages. Additionally, the Agile projects have constantly changing requirements along with a low cycle time for testing. Many a times, larger picture of the projects may be lost while implementing the fast paced and iterative Agile development model. The need to constantly make marginal improvements may often result in developing wrong solutions that later need to be redone. The typical cause of this problem is lack of detailing at a system level as the entire focus is shifted to feature level. The detailing at the system level is lost due to reduced timelines, which is the nature of such projects.

The above problem may be avoided by automating the process of design generation, i.e. by converting the software development requirements to design artefacts without any manual involvement. Such design artefacts may then act as a benchmark model for the system and can help stakeholders from the Business and IT teams to collaborate and have a common vision for the system. Such design artefacts also make it easy to track, review and prioritize the activities in the process of software development.

SUMMARY

In one embodiment, a method for deriving use case diagrams for software development is disclosed. In one example, the method comprises extracting core components from software development requirements. The core components comprise a core message and a condition. The method further comprises determining one activity from the core components. The method further comprises extracting a class and an attribute from the core components. The method further comprises deriving a use case diagram based on the activity and the class and the attribute.

In one embodiment, a system for deriving use case diagrams for software development is disclosed. In one example, the system comprises one processor and a memory communicatively coupled to the processor. The memory stores processor-executable instructions, which, on execution, cause the processor to extract core components from each software development requirements. The core components comprise of a core message and a condition. The processor-executable instructions, on execution, further cause the processor to determine an activity from the core components. The processor-executable instructions, on execution, further cause the processor to extract a class and an attribute from the core components. The processor-executable instructions, on execution, further cause the processor to derive a use case diagram based on the activity and the class and the attribute.

In one embodiment, a non-transitory computer-readable medium storing computer-executable instructions for deriving use case diagrams for software development is disclosed. In one example, the stored instructions, when executed by a processor, cause the processor to perform operations comprising extracting core components from software development requirements. The core components comprise a core message and a condition. The operations further comprise determining an activity from the one or more core components. The operations further comprise extracting a class and an attribute from the core components. The operations further comprise deriving a use case diagram based on the activity and the class and the attribute.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
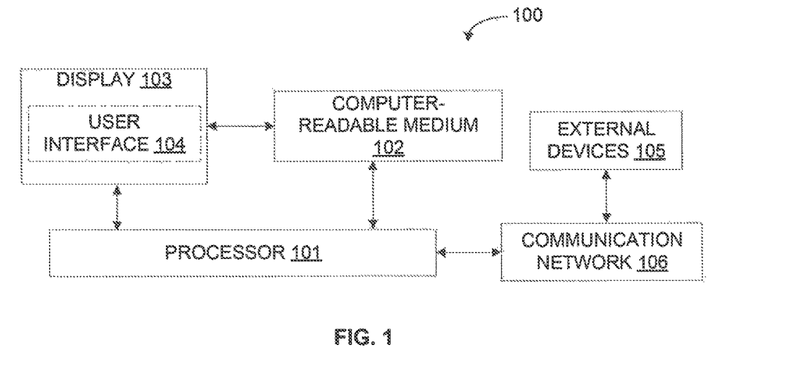
FIG. 1 is a block diagram of an exemplary system for deriving standard diagrams for software development in accordance with some embodiments of the present disclosure.

Referring now to FIG. 1, an exemplary system 100 for deriving standard diagrams for software development is illustrated in accordance with some embodiments of the present disclosure. In particular, the system 100 (e.g., laptop, netbook, or any other computing device) implements a standard diagram modeling engine for deriving standard diagrams for software development. The standard diagrams may include static structural diagrams (e.g., component diagram, class diagram, etc.) or dynamic behavioral diagrams (e.g., state transition diagrams, activity diagram, use case diagram, etc.). As will be described in greater detail in conjunction with FIG. 2, the standard diagram modeling engine comprises multiple modules configured to process software development requirements so as to derive standard diagrams. For example, the standard diagram modeling engine extracts one or more core components from each of a plurality of software development requirements, determines at least one activity from the one or more core components, extracts at least one of a class and an attribute from the one or more core components, and derives at least one use case diagram based on the at least one activity and the at least one of the class and the attribute. The one or more core components comprise at least one of a core message and a condition.

The system 100 comprises one or more processors 101, a computer-readable medium (e.g., a memory) 102, and a display 103. The computer-readable storage medium 102 stores instructions that, when executed by the one or more processors 101, cause the one or more processors 101 to derive standard diagrams in accordance with some embodiments of the present disclosure. For example, the computer-readable storage medium 102 may store set of instructions for extracting core components from software development requirements, determining activities, classes, and attributes, and deriving standard diagrams corresponding to various modules. The one or more processors 101 may fetch the instructions from the computer-readable storage medium 102 via a wired or wireless communication path, and execute them to derive standard diagrams.

The computer-readable storage medium 102 may also store various data (e.g., software development requirements, core components, activities, interrelationships, classes, attributes, methods, tokens, part of speech (PoS) tags for tokens, PoS patterns, language pattern, pre-defined attributes, domain knowledge, similar activities, standard diagrams, and so forth) that may be captured, processed, and/or required by the system 100. The system 100 interacts with a user via a user interface 104 accessible via the display 103. The system 100 may also interact with one or more external devices 105 over a wired or wireless communication network 106 for sending or receiving various data. The external devices 105 may include, but are not limited to, a remote server, a digital device, or another computing system.

Figure 2:
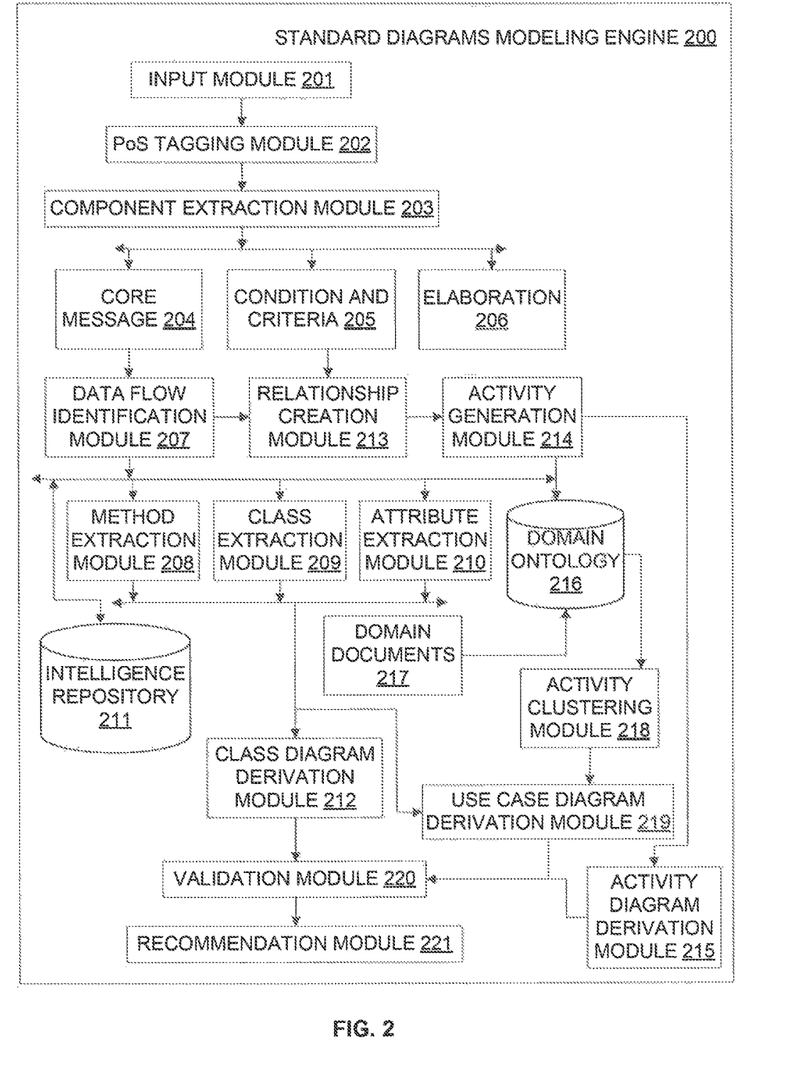
FIG. 2 is a functional block diagram of a standard diagram modeling engine in accordance with some embodiments of the present disclosure.

Referring now to FIG. 2, a functional block diagram of the standard diagram modeling engine 200 implemented by the system 100 of FIG. 1 is illustrated in accordance with some embodiments of the present disclosure. The standard diagram modeling engine 200 may include various modules that perform various functions so as to derive standard diagrams from software development requirements. In some embodiments, the standard diagram modeling engine 200 comprises an input module 201, a PoS tagging module 202, a component extraction module 203, a data flow identification module 207, a method extraction module 208, a class extraction module 209, an attribute extraction module 210, an intelligence repository 211, a class diagram derivation module 212, a relationship creation module 213, an activity generation module 214, an activity diagram derivation module 215, a domain ontology database 216, an activity clustering module 218, a use case diagram derivation module 219, a validation module 220, and a recommendation module 221.

The input module 201 receives software development requirements from one or more data sources. The one or more data sources may include, but are not limited to, a user (e.g., end user, software developer, etc.), an application (e.g., ADOBE ACROBAT®, MICROSOFT® WORD®, INTERNET EXPLORER®, etc.), or any other connected system (e.g., enterprise resource planning (ERP) system, customer relationship management (CRM) system, any other computing system, etc.). It should be noted that, in some embodiments, the software development requirements may be provided in unstructured textual format as an input or requirement dump. In some embodiments, the software development requirements from different sources may be standardized prior to being fed into the standard diagram modeling engine 200. Alternatively, in some embodiments, the input module 201 may standardize the software development requirements received from different sources. The software development requirements are subsequently processed by various modules to generate system design and to derive standard diagrams.

The PoS tagging module 202 extracts a number of tokens (i.e., words or phrases) from each of the software development requirements, determines PoS tags corresponding to the tokens, and determines PoS patterns based on the PoS tags. Thus, the PoS tagging module 202 breaks each requirement into individual tokens, and determines PoS tags for each of the tokens. Upon determination of the PoS tags for individual tokens, the PoS tagging module 202 combines one or more PoS tags to determine PoS patterns based on a set of rules. For example, noun followed by any number of nouns (e.g., customer reference number) may be combined together as single noun. Similarly, noun followed by a conjunction and a noun (e.g., Date and Time) may be combined together as a single noun. In other words, multiple PoS tags may be combined to form a single pattern to have a consistent view of the requirement. By way of example, an exemplary requirement along with its tokens, corresponding PoS tags, and PoS pattern is provided in Table A below. In this case the two nouns 'Car' and 'Loan' is combined as a single noun 'Car Loan'.

TABLE A

| Requirement | Tokens | PoS Tags | PoS Pattern |
|---|---|---|---|
| System should allow user to apply for a Car Loan | System | NN | NN |
| | Should | MD | MD |
| | Allow | VB | VB |
| | User | NN | NN |
| | To | IN | IN |
| | Apply | VB | VB |
| | For | IN | IN |
| | A | DT | DT |
| | Car | NN | NN |
| | Loan | NN | |

The component extraction module 203 extracts core components from the software development requirements. The core components may include, but are not limited to, a core message 204, a condition 205, a criteria 205, an elaboration 206, and a justification. Thus, the software development requirements are broken down into or classified into various aspects such as core message 204, condition 205, criteria 205, elaboration 206, justification, and so forth. The core message 204 in the requirement contains the key entities and the actions to create the system design and standard diagrams. The other components like condition 205, criteria 205, elaboration 206, and justification provide additional information regarding the requirement in terms of when and how a given functionality of the system should behave. For example, the core message of a requirement 'System should allow customers to withdraw only when the balance is above INR 500, however this should not apply to Diamond customers' is 'System should allow customers to withdraw'. The requirement is associated with the condition 'when the balance is above INR 500'. Further, the requirement provides the type of customers (i.e., Diamond customers) the condition should not apply to, which is the Elaboration. As will be appreciated, in the above example, the key entities and classes can be extracted from the core message. It is therefore necessary to segregate the core message 204 from the other components of the requirement since it is the part which contains details regarding system design.

Once the core message is segregated, it is important to understand the various entities present in the requirement and the way they interact with each other. This forms the basis for creating the system design and standard diagram. The data flow identification module 207 aggregates together simplified POS pattern from the core message to create a language pattern. As will be appreciated, only essential or key POS patterns (e.g., nouns, verbs, prepositions, etc.) may be considered for determining the language pattern. In some embodiments, the language pattern may be in a pre-defined format with a unique identifier for each of the essential tags. By way of example, an exemplary language pattern (also referred to as parsing pattern) for the requirement provided in Table A may be as follows:

NN System NN @allow@ NN User NN IN TO IN @ apply @ IN For IN NN Car Loan NN Example 1

Upon determination of the language pattern, the data flow identification module 207 may be parsed syntactically to identify a data flow in the software development requirement. The data flow may include actions connecting various entities as well as direct interaction between the entities. Thus, the data flow identification module 207 parses the language pattern to detect presence of data representing actions in the core message. In some embodiments, the actions may be identified by detecting for outward interactions from the system. By way of example, in the language pattern provided Example 1, 'Apply' is an action based verb, and its association with the preposition 'For' represents an association with the noun 'Car Loan'. Thus, 'Apply' is flagged as the core action, 'Car Loan' as the object, and 'User' as the subject of the requirement. This data flow represents the entire activity in the requirement. The identified data flow may be stored in an intelligence repository 211, and may also be subsequently used to determine attributes, classes, and methods or functions.

The method extraction module 208 extracts methods or functions from the data flow. The method in the requirement may be determined by parsing action in the requirement, and checking its relationship with the entities. In some embodiments, methods are identified by combining the action with the extracted object. Thus, in Example 1, the method is 'apply Car Loan'.

The class extraction module 209 extracts the classes from the core messages based on a pre-defined set of rules and a statistical model. As will be described in greater detail below, the extraction of classes is based on the match with respect to an iterative shortlisting process.

The attributes extraction module 210 extracts attributes from the core messages by matching the PoS patterns against pre-defined attributes from a list of pre-defined attributes. The list of pre-defined attributes may be collected and stored separately before the data is processed. The input data (i.e., PoS pattern) may be matched against the pre-defined attributes to determine the attributes in the requirement. For example, 'number' may be a pre-defined attribute in the list of pre-defined attributes, and the requirement may have a PoS pattern 'customer reference number'. The 'PoS pattern 'customer reference number' may then be matched against the pre-defined attribute 'number', and may be flagged as an attribute for the requirement based upon the match.

The intelligence repository 211 is the central database that comprises intelligence required for classification. The intelligence repository 211 includes domain terms, attribute terms, and the statistical model and rules that may be used to classify the classes.

As will be appreciated, the noun phrases typically represent the classes and the attributes. Thus, in the Example 1 considered above, the noun phrases in the requirement include the following: System, User, and Car Loan. As discussed above, the extracted noun phrases (also referred to as concepts) are matched against pre-defined attributed from a list of pre-defined attributes. In the Example 1 considered above, there is no evidence of any noun phrase (i.e., System, User, and Car Loan) that may be related to a pre-defined attribute and therefore no attribute is found for the given requirement.

The candidate classes may also be found from noun phrases (i.e., concepts) based on the pre-defined set of rules. The noun phrases or concepts may be tested for presence of evidence to classify them as a class. In some embodiments, elements such as information technology (IT) terms (e.g., system, database, etc.) may be excluded while evaluating noun phrases. As will be appreciated, such elements may be collected and stored beforehand. In some embodiments, the pre-defined set of rules may be applied to find a first list of candidate classes. In some embodiments, the pre-defined set of rules may include, but are not limited to, classes should be objects in the core message, classes must be recurring (i.e., not infrequent), classes may have attributes linked to them, classes may correspond to domain based pre-defined terms, and each class should have more number of actions linked to it.

As will be appreciated, the concept may be exception to one or more of the pre-defined set of rules when considered in isolation. However, if the concept match to more number of pre-defined rules, then the likelihood of concept being classified as the class may be high. For example, in the Example 1, the noun phrase 'Car Loan' may be flagged as a candidate class (i.e., potential class) due to evidences from two of the rules, i.e. it being classified as an object, and it being corresponding to a domain term called 'Loan'. Again, once this action is performed for all the requirements in the dump, it is further checked that whether more number of actions match the entry flagged as a candidate class. In general, any entity which is a class may not be occurring infrequently in a set of requirements combined together.

By way of example, such an exception with an exemplary requirement similar to the requirement of Example 1 is described herein. In the exemplary requirement 'System should allow user to import configuration files', the 'user' is the subject, 'import' is the action, and 'configuration files' is the object. Further, as described above 'import configuration file' becomes the method or function. However, such requirements may be standalone, and the rules applied for class extraction typically may not be observed for interface files. As will be appreciated, these are typical examples of infrequent concepts with not many methods or functions linked to them, and they are therefore discarded from consideration as potential classes.

Once the candidate classes are identified from requirement dump, they are checked for similarity with respect to domain specific concepts or terminologies for strengthening the evidence for further shortlisting. In some embodiments, the domain specific concepts or terminologies 216 which may be extracted by parsing through domain specific documents 217. Such domain specific documents may include, but are not limited to, previous requirements, annual reports of companies belonging to domain, domain specific articles, and domain specific News. A full or partial match with the topics or terms in the domain specific database further shortlists a second list of potential classes for the next steps of the iterative shortlisting process. For example domain specific term may be 'loan' and the requirement may include a noun phrase or a concept called 'Car Loan'. Thus, a partial match in either direction (i.e., left or right) shortlists the term as a potential class.

Further, a statistical model may be executed based on support vector machines or logistic regression techniques to find the probability of an entity being a class. In some embodiments, a number of variables may be employed for the purpose. In some embodiments, the variables may include, but are not limited to, presence in core message, linkage to an attribute in any of the requirements in the requirement dump, direct relationship with an action verb, and linkage to other potential classes in other requirements. For example, in the core message 'system should allow a customer to pre-close a Car Loan', the verb 'pre-close' is linked to the potential class 'Car Loan' directly. As will be appreciated, linkage to other potential classes in other requirements may be based on premise that a class will always have interactions with other classes.

In some embodiments, old requirements may be collected and flagged manually to create a training set based on an initial set of variables. The training set may then be iteratively used to further extract new set of variables till most of the variables are acquired. Upon acquisition of the variables, a weightage of each of these variables may be determined. The variables are then employed to identify classes from a new and unseen set of requirements. The statistical model may be employed to predict a probability score for each of the individual candidates (potential classes) from the second list. The candidates having a probability above a pre-defined threshold (e.g., above 0.5) may be flagged as classes.

Further, in some embodiments, the classes that match with pre-defined classes from a list of pre-defined classes may also be flagged as classes, thereby ensuring greater accuracy as some of the classes may be wrongly classified by the statistical model. As will be appreciated, in some embodiments, the pre-defined classes may be provided by the users. For example, the pre-defined classes may be tagged or identified by the users in historical requirement dump or in current requirement dump. Additionally, in some embodiments, the pre-defined classes may be sourced from an external knowledge source (e.g., a dictionary, domain knowledge, etc.). The list of pre-defined classes may also be used to show inheritance when more than one class matches with a pre-defined class. For example, 'Loan' may be a pre-defined class list and the requirements may have concepts such as 'Home Loan' and 'Car Loan'. In this case, both 'Home Loan' and 'Car Loan' may map to the pre-defined class 'Loan', and may therefore inherit the base class 'Loan'.

Upon extraction of classes and attributes, the case diagram derivation module 212 derives one or more class diagrams based on the classes and the attributes. The relationship creation module 213 merges the entities based on the identified data flow as well we as extracted conditions 205 and criteria 205 so as to represent a relationship among them. For example, in the requirement of Example 1, the entities are merged and flagged as below:

User---Apply--->Loan

The activity generation module 214 parses all the requirements based on their corresponding data flow, and sorts them by the action and origin point (user in the case of Example 1). Thus, activities having similar origin are flagged together. The activity diagram derivation module 215 depicts the activities flagged together in the form of an activity diagram.

As will be appreciated, each requirement represents a unique action or activity which may be interrelated to other requirements in the requirement dump. The activity clustering module 218 aggregates or groups together similar activities from all the determined activities. In some embodiments, the identified activities are vetted through domain based models (i.e., against domain knowledge) to group together similar activities. For example, 'withdraw money' and 'update account' are similar activities. In some embodiments, the domain based models are built on domain knowledge comprising a plurality of historical activities with a corresponding similarity index. The historical activities and corresponding similarity index are stored in the domain ontology 216. The domain knowledge itself is built using domain specific documents 217, from historically collected data sets, and human interaction based prior learning or training.

Upon aggregation of similar activities, the one or more sets of similar activities may be rendered in the form of one or more use case diagrams. The use case diagram derivation module 219 derives one or more use case diagrams based on the similar activities, as well as associated classes and attributes. As will be appreciated, the standard diagrams (i.e., class diagram, activity diagram, use case diagram, etc.) may be derived by converting the parsed elements into formats readable by industry standard tools (e.g., Enterprise Architecture) so as to depict in diagrammatic form.

By way of example, in some embodiments, an exemplary requirement dump is provided in Table B below:

TABLE B

| Serial Number | Requirement Description |
|---|---|
| 1 | User should be able to authenticate his Account himself using his PIN number |
| 2 | User should be able to select the transaction from the list |
| 3 | System should display a message to the user when the transaction is complete |
| 4 | System should enter his first name and email address in the Loan application |
| 5 | System should allow user to select the Total Amount for the loan |

By way of example, in some embodiments, the extracted methods, attributes, and classes for the exemplary requirement dump of Table B is provided in Table C below:

TABLE C

| ID | Method | Attribute | Class |
|---|---|---|---|
| 1 | Authenticate Account | PIN Number | User |
| 2 | select transaction | NA | User, Transaction |
| 3 | display message | | User |
| 4 | enter first name and email address | first name, email address | User, Loan |
| 5 | select Total Amount | Total Amount | Loan, User |

By way of example, in some embodiments, the activities for the exemplary requirement dump of Table B is provided in Table D below:

TABLE D

| ID | Subject | Action | Object | Condition |
|---|---|---|---|---|
| 1 | User | Authenticate | Account | |
| 2 | User | Select | Transaction | Transaction is completed |
| 3 | System | Display Message | User | |
| 4 | User | Enter | first name, email address | |
| 5 | User | Select Amount | Loan | |

The activities provided in the Table D may be grouped into a set of similar activities for creation of activity diagram. For example, activities having activity ID 1, 2 and 3 may be grouped together as the 'Withdrawal process' and activities having ID 4 and 5 may be clubbed as 'Loan Application process' based on domain ontology and similarity index of activities. These set of two activities may then be rendered in the form of use cases diagram.

The design validation module 220 validates the standard diagrams (e.g., class diagram, use case diagram, activity diagram, etc.) based on a pre-defined set of rules to determine one or more deviations from best practices. In some embodiments, the design created from the software development requirements may be validated based on best practices from object oriented programming. The validation 220 also takes into account activities that may be unrelated to each other. The result of validation (e.g., deviations) for such unrelated activities may be passed back to the business stakeholder to indicate requirements that have not been gathered completely. The recommendation module 221 generates one or more recommendations based on the one or more deviations. Thus, in some embodiments, the recommendations module 221 generate recommendations to improve the design based on the type of violation exhibited in the generated design.

As will be appreciated by those skilled in the art, all such aforementioned modules and submodules may be represented as a single module or a combination of different modules. Further, as will be appreciated by those skilled in the art, each of the modules may reside, in whole or in parts, on one device or multiple devices in communication with each other.

Further, as will be appreciated by one skilled in the art, a variety of processes may be employed for deriving standard diagrams for software development from requirement dump. For example, the exemplary system 100 may derive standard diagram from software requirements by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
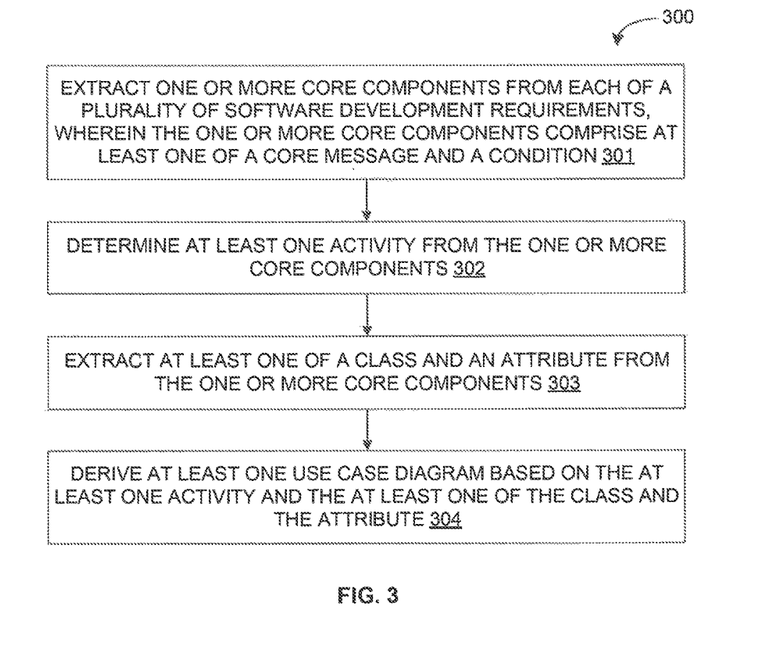
FIG. 3 is a flow diagram of an exemplary process for deriving standard diagrams for software development in accordance with some embodiments of the present disclosure.

For example, referring now to FIG. 3, exemplary control logic 300 for deriving standard diagrams for software development via a system, such as system 100, is depicted via a flowchart in accordance with some embodiments of the present disclosure. As illustrated in the flowchart, the control logic 300 includes the steps of extracting one or more core components from each of a plurality of software development requirements at step 301, determining at least one activity from the one or more core components at step 302, extracting at least one of a class and an attribute from the one or more core components at step 303, and deriving at least one use case diagram based on the at least one activity and the at least one of the class and the attribute at step 304. The one or more core components comprise at least one of a core message and a condition.

In some embodiments, extracting one or more core components at step 301 comprises extracting a plurality of tokens from each of the plurality of software development requirements, determining a plurality of part of speech (PoS) tags corresponding to the plurality of tokens, and determining a plurality of PoS patterns based the plurality of PoS tags. Each of the plurality of tokens comprises a word or a phrase. Additionally, in some embodiments, determining the at least one activity at step 302 comprises determining the at least one activity from the at least one of the core message and the condition. In some embodiments, the at least one activity may be determined by aggregating the plurality of PoS patterns to determine a language pattern, and parsing the language pattern to determine the at least one activity and a relationship. In some embodiments, control logic 300 further includes the step of deriving at least one activity diagram based on the at least one activity and the relationship. Moreover, in some embodiments, extracting the attribute at step 303 comprises extracting the attribute from the core message by matching the plurality of PoS patterns against a plurality of pre-defined attributes.

In some embodiments, extracting the class at step 303 comprises extracting the class from the core message based on a pre-defined set of rules and a statistical model via an iterative shortlisting process. Additionally, in some embodiments, control logic 300 further includes the step of deriving at least one class diagram based on the at least one of the class and the attribute. Further, in some embodiments, deriving the at least one use case diagram at step 304 comprises aggregating a set of similar activities from the at least one activity based on domain knowledge, and rendering the set of similar activities as the at least one use case diagram. In some embodiments, the domain knowledge comprises a plurality of historical activities with a corresponding similarity index. In some embodiments, control logic 300 further includes the step of validating the at least one use case diagram based on a pre-defined set of rules to determine one or more deviations from best practices, and generating one or more recommendations based on the one or more deviations.

Figure 4:
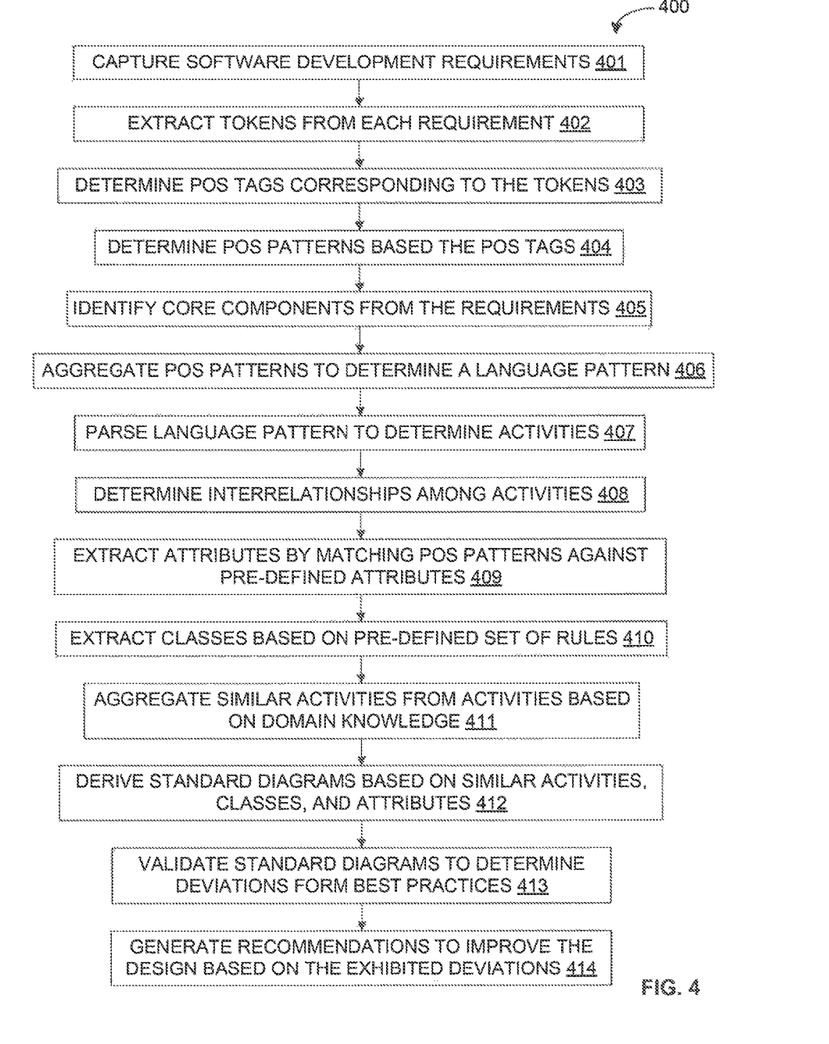
FIG. 4 is a flow diagram of a detailed exemplary process for deriving standard diagrams for software development in accordance with some embodiments of the present disclosure.

Referring now to FIG. 4, exemplary control logic 400 for deriving standard diagrams for software development is depicted in greater detail via a flowchart in accordance with some embodiments of the present disclosure. As illustrated in the flowchart, the control logic 400 includes the steps of capturing software development requirements at step 401, extracting a plurality of tokens from each of the software development requirements at step 402, determining a plurality of PoS tags corresponding to the plurality of tokens at step 403, and determining a plurality of PoS patterns based the plurality of PoS tags at step 404. The control logic 400 further includes the step of identifying a plurality of core components from the software development requirements at step 405. Each of the plurality of core components may include at least one of one or more core messages, one or more conditions, one or more criteria, and so forth.

Further, the control logic 400 includes the steps of aggregating the plurality of PoS patterns of the one or more core messages to determine a language pattern at step 406, and parsing the language pattern to determine a plurality of activities at step 407. Additionally, the control logic 400 includes the step of determining interrelationships among the plurality of activities from the one or more conditions and the one or more criteria at step 408. The control logic 400 further includes the step of extracting a plurality of attributes from the one or more core messages by matching each of the plurality of PoS patterns against pre-defined attributes from the list of pre-defined attributes at step 409. Further, the control logic 400 includes the step of extracting classes from the one or more core messages based on at least one of a pre-defined set of rules, a domain knowledge, and a statistical model via an iterative shortlisting process at step 410.

Further, the control logic 400 includes the steps of aggregating a set of similar activities from the plurality of activities based on a domain knowledge at step 411, and deriving one or more standard diagrams based on at least one of the set of similar activities, the plurality extracted classes, and the plurality of extracted attributes at step 412. Each of the standard diagrams may include at least one of one or more activity diagrams, one or more class diagrams, one or more use case diagrams, and so forth. Moreover, the control logic 400 includes the steps of validating each of the one or more standard diagrams to determine one or more deviations from standard best practices at step 413, and generating one or more recommendations to improve the design (i.e., the one or more standard diagrams) based on the one or more exhibited deviations at step 414.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide for robust and efficient mechanism to derive standard diagrams for software development from software requirements without any human intervention. The techniques enable accept software development requirements (i.e., user stories) in unstructured textual format, and uses natural language processing (NLP) techniques to break down each of the requirements into its core components so as to model the behavior of the software to be developed. This is achieved by extracting the key entities in the requirements and the relationship associating the entities. Once the entity extraction is completed, the data is aggregated for the entire requirement set and is converted into codes readable by third party tools to model the design (i.e., standard diagram) of the system.

As will be appreciated, the extraction of core components such as core message from requirements ensures separation of parts that should not be considered for class identification. Further, as will be appreciated, the techniques described in the embodiments discussed above provide for creation of rules and statistical model as well as provide for employment of domain knowledge for extraction of classes, thereby ensuring accuracy in the identification of classes. Further, as will be appreciated, the techniques described in the embodiments discussed above identifies patterns in the components and data flow for detecting relations and identifying activities. This ensures that the activities and interrelationships among them are accurately determined. Moreover, the techniques described in the embodiments discussed above employ domain intelligence to group similar activities to arrive at use case diagram, thereby ensuring accuracy.

The specification has described system and method for representing software development requirements into standard diagrams. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for deriving use case diagrams for software development, the method comprising:

retrieving, by a modeling engine, one or more core components from each of a plurality of software development requirements, wherein the one or more core components comprise at least one of a core message and a condition, and wherein the plurality of software development requirements are in unstructured textual format;

determining, by the modeling engine, at least one activity from the one or more core components;

determining, by the modeling engine, at least one of a class and an attribute from the one or more core components, wherein determining the class comprises determining the class from the core message based on a pre-defined set of rules and a statistical model via an iterative shortlisting process; and deriving, by the modeling engine, at least one use case diagram based on the at least one activity and the at least one of the class and the attribute, wherein deriving the at least one use case diagram comprises aggregating a set of similar activities from the at least one activity based on domain knowledge.

2. The method of claim 1, wherein retrieving one or more core components comprises:

determining a plurality of tokens from each of the plurality of software development requirements, wherein each of the plurality of tokens comprises a word or a phrase;

determining a plurality of part of speech (PoS) tags corresponding to the plurality of tokens; and determining a plurality of PoS patterns based the plurality of PoS tags.

3. The method of claim 2, wherein determining the at least one activity comprises determining the at least one activity from the at least one of the core message and the condition by:

aggregating the plurality of PoS patterns to determine a language pattern;

parsing the language pattern to determine the at least one activity and a relationship.

4. The method of claim 3, further comprising deriving at least one activity diagram based on the at least one activity and the relationship.

5. The method of claim 2, wherein determining the attribute comprises determining the attribute from the core message by matching the plurality of PoS patterns against a plurality of pre-defined attributes.

6. The method of claim 1, further comprising deriving at least one class diagram based on the at least one of the class and the attribute.

7. The method of claim 1, wherein deriving the at least one use case diagram further comprises:

rendering the set of similar activities as the at least one use case diagram.

8. The method of claim 7, wherein the domain knowledge comprises a plurality of historical activities with a corresponding similarity index.

9. The method of claim 1, further comprising:

validating the at least one use case diagram based on a pre-defined set of rules to determine one or more deviations from best practices; and generating one or more recommendations based on the one or more deviations.

10. A system for deriving use case diagrams for software development, the system comprising:

at least one processor; and a computer-readable medium storing instructions that, when executed by the at least one processor, cause the at least one processor to perform operations comprising:

retrieving one or more core components from each of a plurality of software development requirements, wherein the one or more core components comprise at least one of a core message and a condition, and wherein the plurality of software development requirements are in unstructured textual format;

determining at least one activity from the one or more core components;

determining at least one of a class and an attribute from the one or more core components, wherein determining the class comprises determining the class from the core message based on a pre-defined set of rules and a statistical model via an iterative shortlisting process; and deriving at least one use case diagram based on the at least one activity and the at least one of the class and the attribute, wherein deriving the at least one use case diagram comprises aggregating a set of similar activities from the at least one activity based on domain knowledge.

11. The system of claim 10, wherein retrieving one or more core components comprises:

retrieving a plurality of tokens from each of the plurality of software development requirements, wherein each of the plurality of tokens comprises a word or a phrase;

determining a plurality of part of speech (PoS) tags corresponding to the plurality of tokens; and determining a plurality of PoS patterns based the plurality of PoS tags.

12. The system of claim 11, wherein determining the at least one activity comprises determining the at least one activity from the at least one of the core message and the condition by:

aggregating the plurality of PoS patterns to determine a language pattern;

parsing the language pattern to determine the at least one activity and a relationship.

13. The system of claim 11, wherein determining the attribute comprises determining the attribute from the core message by matching the plurality of PoS patterns against a plurality of pre-defined attributes.

14. The system of claim 10, wherein deriving the at least one use case diagram further comprises:

rendering the set of similar activities as the at least one use case diagram.

15. The system of claim 14, wherein the domain knowledge comprises a plurality of historical activities with a corresponding similarity index.

16. The system of claim 10, further comprising:

validating the at least one use case diagram based on a pre-defined set of rules to determine one or more deviations from best practices; and generating one or more recommendations based on the one or more deviations.

17. A non-transitory computer-readable medium storing computer-executable instructions for:

retrieving one or more core components from each of a plurality of software development requirements, wherein the one or more core components comprise at least one of a core message and a condition, and wherein the plurality of software development requirements are in unstructured textual format;

determining at least one activity from the one or more core components;

determining at least one of a class and an attribute from the one or more core components, wherein determining the class comprises determining the class from the core message based on a pre-defined set of rules and a statistical model via an iterative shortlisting process; and deriving at least one use case diagram based on the at least one activity and the at least one of the class and the attribute, wherein deriving the at least one use case diagram comprises aggregating a set of similar activities from the at least one activity based on domain knowledge.

18. The non-transitory computer-readable medium of claim 17, wherein deriving the at least one use case diagram further comprises:
rendering the set of similar activities as the at least one use case diagram.

19. The non-transitory computer-readable medium of claim 17, wherein the domain knowledge comprises a plurality of historical activities with a corresponding similarity index.

\* \* \* \* \*